March 29, 1955   R. HEIMSOTH   2,705,082
RAKE ATTACHMENT FOR TRACTOR MOUNTED FRONT END LOADERS
Filed Aug. 10, 1953
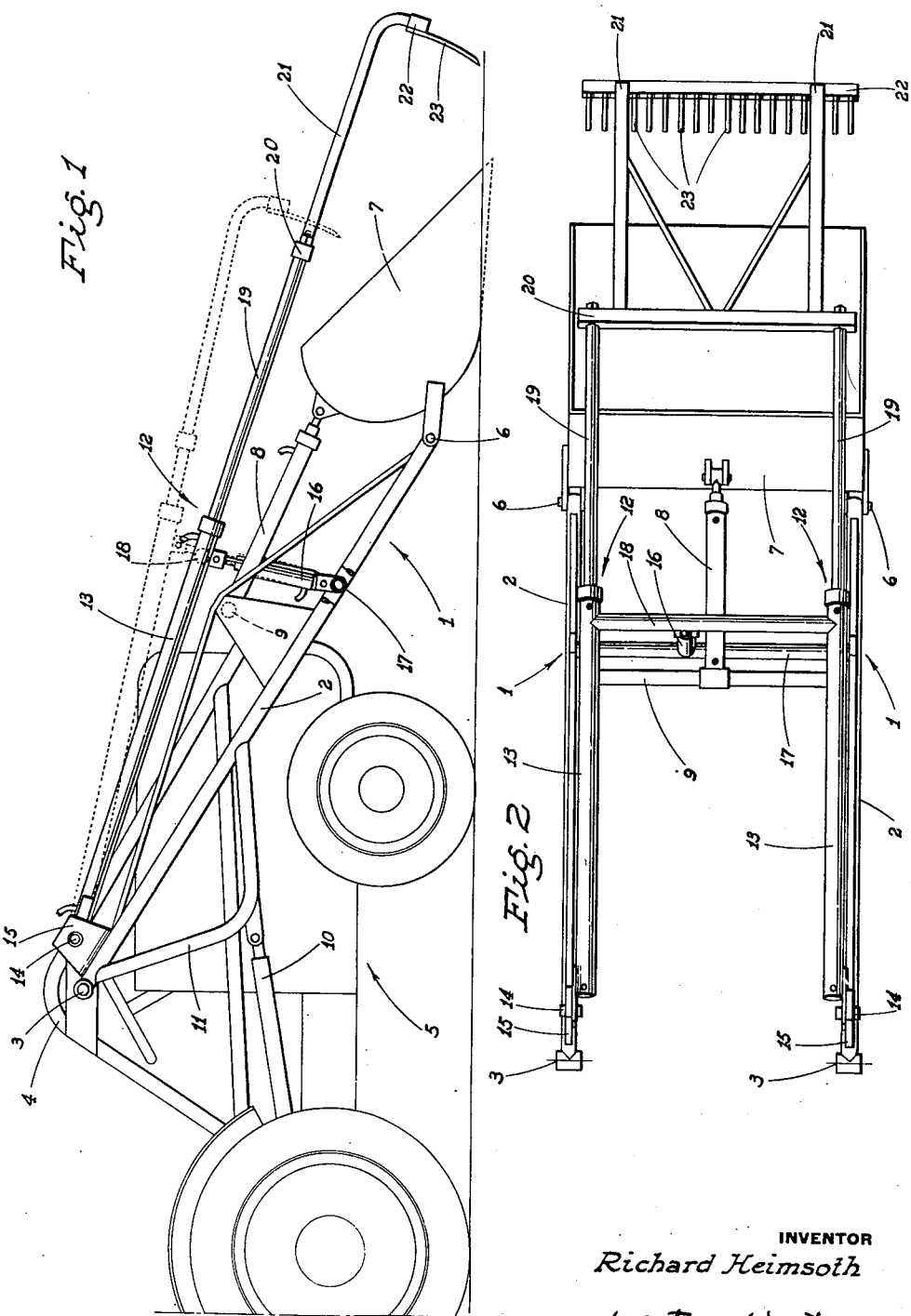
INVENTOR
Richard Heimsoth
BY
ATTORNEYS

United States Patent Office 2,705,082
Patented Mar. 29, 1955

2,705,082

RAKE ATTACHMENT FOR TRACTOR MOUNTED FRONT END LOADERS

Richard Heimsoth, Gardnerville, Nev.

Application August 10, 1953, Serial No. 373,398

2 Claims. (Cl. 214—510)

The present invention is directed to, and it is a major object to provide, a novel rake attachment for a tractor mounted front end loader having a forwardly opening scoop or bucket adapted to be lowered to a ground engaging position; the attachment including a power actuated rake operative to reach ahead of the bucket when it is in said position, and to then rake loose material on the ground rearwardly into the bucket, whereby to aid in loading the latter.

The rake attachment is especially designed but not limited for use to rake-load loose material, such as stones or the like, which otherwise tend to roll ahead of the bucket, and which impairs proper loading thereof.

Another important object of the present invention is to provide a rake attachment, for the purpose described, which embodies a novel rake supporting frame associated with the push frame of the loader; said rake supporting frame being vertically swingable and including a reciprocable rake mounting section. The rake supporting frame is vertically swung up or down, and said rake mounting section is reciprocated longitudinally to and fro by selectively and independently operative power means, whereby to impart a cyclic motion to the rake, which motion comprises a rearward stroke with the rake lowered and working on the ground toward and thence into the bucket, and a forward stroke with the rake raised above the ground and bucket.

An additional object of the invention is to provide a rake attachment, as in the preceding paragraph, in which said power means includes a novel assembly of fluid pressure power cylinders associated with the rake supporting frame; said cylinders being arranged to swing said frame up or down, and to longitudinally reciprocate said rake mounting section, selectively and independently.

It is also an object of the invention to provide a rake attachment, for a tractor mounted front end loader, which is designed for ease and economy of manufacture; ready adaptation to conventional front end loader implements; and positive operation for the purpose of raking loose material from the ground into the bucket of the loader.

Still another object of the invention is to provide a practical, reliable, and durable rake attachment for tractor mounted front end loaders, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the rake attachment as arranged in connection with a tractor mounted front end loader; the rake supporting frame being shown in full lines in its lowered position, with the rake advanced, and in dotted lines in a raised position with the rake retracted.

Fig. 2 is a top plan of the rake attachment as mounted in connection with a front end loader, as in Fig. 1, but with the tractor omitted.

Referring now more particularly to the characters of reference on the drawings, the novel rake attachment is adapted for use in connection with a front end loader of the type having a longitudinally extending main push frame, indicated generally at 1, and which includes trussed, transversely spaced, longitudinal push beams 2 pivoted at their rear ends, as at 3, to the upper end portions of arch frames 4 fixedly secured on opposite sides to a tractor, indicated generally at 5.

The push beams 2 are of such length that they project to a front end termination ahead of the tractor 5, and at such ends the push beams 2 are pivoted, as at 6, at transversely spaced points to the rear of a forwardly opening scoop-type bucket 7. Such scoop-type bucket 7 is conventionally swung about the pivots 6 between scooping, carrying, or dumping positions by means of a fluid pressure power cylinder 8, of double-acting type, which pivotally connects between the back of the bucket 7 and a cross bar 9 which extends between the truss structure of the push beams 2.

The main push frame 1 is swingable up or down by means of fluid pressure power cylinders 10 disposed longitudinally on opposite sides of the tractor, being pivotally coupled between elbow braces 11 on the rear portion of the push beams 2, and a rearward anchor point (not shown) on the tractor.

To the foregoing front end loader I apply the rake attachment which is the subject of the present invention, and which is constructed as follows:

A longitudinal, rake supporting frame, indicated generally at 12, overlies the main push frame 1; such frame 12 including, in the rear half, a pair of transversely spaced, elongated, fluid pressure power cylinders 13 of double-acting type. The power cylinders 13 are pivoted, at their rear ends, as at 14, to brackets 15 which upstand from the push beams 2 at their rear ends; the pivots 14 securing the rake supporting frame 12 on the main push frame 1 for relative vertical swinging motion, which motion is accomplished by an upstanding, fluid pressure power cylinder 16 pivotally connected between a cross bar 17 which spans between the push beams 2 and another cross bar 18 which spans between the elongated power cylinders 13 adjacent their forward ends.

The elongated power cylinders 13 each include, as an element of the rake supporting frame 12, a relatively long, forwardly projecting piston rod 19; said piston rods being connected at their front ends by a cross bar 20.

Transversely spaced rake mounting arms 21 are fixed to and project forwardly from the cross bar 20. At their forward ends the rake mounting arms 21 turn downwardly and are fixed to a transverse rake bar 22 having a multiplicity of rake teeth 23 depending therefrom. The piston rods 19, when fully extended, dispose the rake teeth 23 a substantial distance ahead of the bucket 7.

The width of the rake unit, including the transverse rake bar 22 and row of depending rake teeth 23 is such that said rake unit may move into the forwardly opening bucket 7 without obstruction.

The piston rods 19, cross bar 20, mounting arms 21, and rake bar 22 comprise a reciprocable forward section of the rake mounting frame.

The described rake attachment is used in the following manner:

With the bucket 7 adjusted to loading position by the power cylinder 8, and lowered into ground engagement by the power cylinders 10, the rake supporting frame 12 is first swung upwardly or raised by the power cylinder 16, whence the power cylinders 13 are simultaneously actuated to advance the piston rods 19 to a point which disposes the rake unit ahead of said bucket.

Thereafter, the power cylinder 16 is relieved of its load, whereupon the rake supporting frame 12 lowers and the rake teeth 23 fall into ground engagement, but still ahead of the bucket 7.

Nextly, the power cylinders 13 are simultaneously actuated to contract or draw the piston rods 19 inwardly, whereby the rake teeth 23 likewise move rearwardly, dragging or raking loose material on the ground—such as stones—rearwardly into the bucket.

After each such rearward raking operation, with positive loading of raked material into the bucket 7, the tractor moves forward slightly and the raking cycle, as above described, is repeated. This cycle may also be accomplished with the tractor continuously slowly moving forwardly.

The respective power cylinders included both in the front end loader implement, and in the rake attachment, are selectively and independently controlled by a valve regulated, fluid pressure supply conduit system, which is omitted from the drawings for the purpose of clarity, but which system is worked by the tractor operator; it being understood, however, that such system is arranged to cause actuation of the pair of power cylinders 10 in unison, and similar actuation of the pair of power cylinders 13.

With the described rake attachment the rake is caused to travel smoothly and positively in a cyclic path, which includes a raised forward stroke clear of the bucket, and a lowered rearward stroke, with the rake first working on the ground and then entering the bucket; all whereby the bucket may be loaded with loose material which initially lies on the ground ahead of the bucket, and which is otherwise difficult to pick up, particularly material of a kind—such as stones—which tends to roll ahead of said bucket.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

I claim:
1. A rake attachment for a tractor-mounted loader which includes a pair of transversely spaced longitudinal beams pivoted at their inner end on the tractor and having a scoop-type bucket therebetween at their outer end adapted for ground engagement; said attachment comprising a pair of transversely spaced double-acting longitudinally extending fluid pressure cylinders disposed above the beams, means pivoting the cylinders at their inner end adjacent the inner end of the beams for vertical swinging motion, piston rods projecting from the outer end of the cylinders, a rake unit fixed on and extending between the pistons at their outer end for cooperation with the bucket, and power means extending between the beams and cylinders to swing the latter about the pivot means.

2. A rake attachment for a tractor-mounted loader which includes a pair of transversely spaced longitudinal beams pivoted at their inner end on the tractor and having a scoop-type bucket therebetween at their outer end adapted for ground engagement; said attachment comprising a pair of transversely spaced double-acting longitudinally extending fluid pressure cylinders disposed above the beams, means pivoting the cylinders at their inner end adjacent the inner end of the beams for vertical swinging motion, piston rods projecting from the outer end of the cylinders, a rake unit fixed on and extending between the pistons at their outer end for cooperation with the bucket, a cross beam connecting the cylinders, another cross beam connecting the longitudinal beams below the first named cross beam, and an extensible fluid pressure power unit connected to and extending between the cross beams substantially between the cylinders.

References Cited in the file of this patent
UNITED STATES PATENTS

| | | |
|---|---|---|
| 155,664 | Muse | Oct. 6, 1874 |
| 1,300,111 | Billings | Apr. 8, 1919 |
| 1,817,361 | Garretson | Aug. 4, 1931 |
| 2,198,087 | Moore | Apr. 23, 1940 |
| 2,418,251 | Drott | Apr. 1, 1947 |
| 2,468,424 | Brauch | Apr. 26, 1949 |
| 2,489,629 | Ford | Nov. 29, 1949 |
| 2,654,165 | Lichtenberg | Oct. 6, 1953 |